(12) United States Patent
Empson et al.

(10) Patent No.: US 9,688,390 B2
(45) Date of Patent: Jun. 27, 2017

(54) LANDING GEAR ASSEMBLY

(71) Applicant: Messier-Dowty Limited, Gloucester, Gloucestershire (GB)

(72) Inventors: Paul Empson, Gloucester (GB); Andrew Paddock, Coleford (GB); Christopher Green, Churchdown (GB)

(73) Assignee: Safran Landing Systems UK LTD (GB)

( * ) Notice: Subject to any disclaimer, the term of this patent is extended or adjusted under 35 U.S.C. 154(b) by 93 days.

(21) Appl. No.: 14/428,083

(22) PCT Filed: Sep. 10, 2013

(86) PCT No.: PCT/GB2013/052367
§ 371 (c)(1),
(2) Date: Mar. 13, 2015

(87) PCT Pub. No.: WO2014/041342
PCT Pub. Date: Mar. 20, 2014

(65) Prior Publication Data
US 2015/0246724 A1    Sep. 3, 2015

(30) Foreign Application Priority Data

Sep. 17, 2012 (GB) .................................. 1216522.1

(51) Int. Cl.
*B64C 25/58* (2006.01)
*B64C 25/20* (2006.01)
*B64C 25/26* (2006.01)

(52) U.S. Cl.
CPC .............. *B64C 25/20* (2013.01); *B64C 25/26* (2013.01); *B64C 25/58* (2013.01)

(58) Field of Classification Search
CPC ......... B64C 25/02; B64C 25/34; B64C 25/50; B64C 25/58; B64C 25/66; B64C 25/14;
(Continued)

(56) References Cited

U.S. PATENT DOCUMENTS

| 2,385,063 | A | 9/1945 | Dreifke |
| 2,437,135 | A | 3/1948 | Steinhoff |

(Continued)

FOREIGN PATENT DOCUMENTS

| CN | 201745745 | 2/2011 |
| CN | 102442429 | 5/2012 |

(Continued)

OTHER PUBLICATIONS

Great Britain Search Report for Great Britain Application No. GB1216522.1 mailed Dec. 12, 2012.
(Continued)

*Primary Examiner* — Benjamin P Lee
(74) *Attorney, Agent, or Firm* — RatnerPrestia

(57) ABSTRACT

A landing gear assembly 10 having first and second parts 12b, 14b movably mounted with respect to one another. The landing gear assembly includes a critical space 32. A spring assembly 26 is arranged to bias the first and second parts to move relative to one another. A spring support 30 is provided to inhibit a broken portion of the spring assembly entering or contacting the critical space following a spring failure.

20 Claims, 2 Drawing Sheets

(58) Field of Classification Search
CPC ......... B64C 25/10; B64C 25/12; B64C 25/18;
B64C 25/00; B64C 25/26; B64C
2025/006
IPC .......... B64C 25/02,25/34, 25/50, 25/58, 25/66,
25/14, 25/10, 25/12, 25/18, 25/00,
25/26, 2025/006
See application file for complete search history.

(56) References Cited

U.S. PATENT DOCUMENTS

| | | | |
|---|---|---|---|
| 3,195,840 A | 7/1965 | Tollar | |
| 3,361,390 A | 1/1968 | Wilkes | |
| 4,757,853 A | 7/1988 | Price | |
| 4,892,270 A * | 1/1990 | Derrien | B64C 25/34 244/103 R |
| 5,269,481 A | 12/1993 | Derrien | |
| 5,577,544 A | 11/1996 | Carper | |
| 6,098,970 A * | 8/2000 | Lowe | F16F 1/128 267/169 |
| 6,811,118 B2 | 11/2004 | Collet | |
| 7,234,664 B1 | 6/2007 | Anderson | |
| 7,324,016 B1 * | 1/2008 | Milgram | B64C 27/023 244/17.11 |
| 8,590,835 B2 * | 11/2013 | Ditzler | B64C 25/26 244/102 R |
| 2003/0102406 A1* | 6/2003 | Chow | B64C 7/00 244/100 R |
| 2007/0223994 A1 | 9/2007 | Cohen | |
| 2009/0057485 A1 | 3/2009 | Seror-Goguet | |
| 2009/0078821 A1* | 3/2009 | Chow | B64C 7/00 244/1 N |
| 2009/0224100 A1 | 9/2009 | Luce | |
| 2011/0278394 A1 | 11/2011 | Ditzler | |
| 2012/0112000 A1* | 5/2012 | Moine | B64C 25/50 244/102 A |
| 2015/0291278 A1* | 10/2015 | Allwein | B64C 25/24 244/102 A |
| 2015/0314861 A1* | 11/2015 | Paddock | B64C 25/26 244/102 A |

FOREIGN PATENT DOCUMENTS

| | | | | |
|---|---|---|---|---|
| EP | 0934874 | | 8/1999 | |
| EP | 1342664 | | 9/2003 | |
| EP | 2386487 | | 11/2011 | |
| FR | EP 1988015 A1 * | 11/2008 | ............. B64C 25/26 |
| GB | 462856 | | 3/1937 | |
| GB | 494557 A * | 10/1938 | ............. B64C 25/20 |
| GB | 558751 | | 1/1944 | |
| GB | 558751 A * | 1/1944 | ............. B64C 25/20 |
| GB | 558752 A * | 1/1944 | ............. B64C 25/14 |
| GB | 579472 | | 8/1946 | |
| GB | 762722 | | 12/1956 | |
| GB | 1191850 | | 5/1970 | |
| GB | 1333200 | | 10/1973 | |
| GB | 2474645 | | 4/2011 | |
| GB | 2477127 | | 7/2011 | |
| WO | 2005005252 | | 1/2005 | |

OTHER PUBLICATIONS

International Search Report for International Application No. PCT/GB2013/052367 mailed Nov. 20, 2013.

* cited by examiner

LANDING GEAR ASSEMBLY

This application is a U.S. National Phase application of PCT International Application No. PCT/GB2013/052367, filed Sep. 10, 2013, which claims the benefit of GB 1216522.1, filed Sep. 17, 2012, both of which are incorporated herein by reference.

BACKGROUND

An aircraft landing gear is generally movable between a deployed condition, for take off and landing, and a stowed condition for flight.

An actuator may be provided for moving the landing gear between the deployed and stowed conditions. These actuators are known in the art as "retraction actuators". A retraction actuator may have one end coupled to the airframe and another end coupled to the main strut such that extension and retraction of the actuator results in movement of the main strut between deployed and stowed conditions.

One or more stay assemblies may be provided to support the orientation of the main strut when the landing gear is in the deployed condition. A stay assembly generally includes a stay and a lock link arranged to maintain the stay in a condition which corresponds to the landing gear being in the deployed condition. The lock link must be 'broken' to enable the stay to be folded, permitting the main strut to be moved by the retraction actuator towards the stowed condition.

It is common for landing gear to be arranged to move towards the deployed condition in the event of a failure of the retraction actuator(s). Initially, the landing gear will move by way of gravity, and in doing so the landing gear forces the stay to move towards the condition which corresponds to the landing gear being in the deployed condition. Such landing gear may include one or more 'down locking' springs arranged to assist in moving landing gear to the deployed condition and locking it in that state by 'making' the lock link. It is common on landing gear for larger aircraft to provide a pair of down locking springs on each stay assembly.

If a down locking spring fails i.e. breaks, it poses a significant safety problem due to the fact that at least one end of the down locking spring will be pivotally coupled to the lock link. As such, the pivotally coupled side of the broken spring can contact or foul other parts of the landing gear, which can result in damage to other components and in some cases may jam the landing gear mechanism.

A number of solutions have been proposed to address the above-noted problem. Firstly, it is known to provide a tether cable or telescopic tube axially within the down locking spring. In the event of a spring failure, the tether cable or telescopic tube maintains the orientation of the broken spring parts. Similarly, it is known to provide a smaller diameter spring axially within the down locking spring. However, telescopic tubes and springs may undesirably increase the weight of the landing gear. A tether cable on the other hand can cause fouling problems during the normal extension and retraction of the spring. In all cases, it can be difficult to service these parts, and it can be difficult to spot a failure.

SUMMARY

In accordance with a first aspect of the present invention, there is provided a landing gear assembly. The landing gear assembly may comprise a first part and a second part movably coupled to the first part so as to be reversibly movable between first and second conditions. The first and/or second parts may be arranged to define a critical space between them when in the second condition. The landing gear assembly may comprise a spring assembly arranged to bias the first part to move relative to the second part. The spring assembly may comprise a spring and a first anchor element coupled to the spring. The first anchor element may be movably coupled to the first part of the landing gear assembly at a first anchor point. The landing gear assembly may comprise a spring support coupled to the spring assembly. The spring support may be coupled to the spring assembly at a location corresponding to, or a location adjacent to the first anchor element. The spring support may be sized to bridge the critical space in the event of a spring failure.

Thus, the spring support is arranged to inhibit a broken spring portion entering the critical space following a spring failure by bridging the critical space. The spring support moves with the broken spring portion and contacts a 'safe' part of the landing gear assembly or landing gear to inhibit further movement towards the critical space. Where the critical space is an opening, the safe part may comprise a part of the landing gear assembly which defines a distal side of the opening, the contact inhibiting the broken spring portion entering the opening. Where the critical space is an engageable surface, such as one or more protrusions and/or recesses, the safe part of the landing gear assembly or landing gear may comprise a peak of the largest protrusion to inhibit the broken spring portion engaging the engageable surface. The invention according to this aspect may therefore provide a simple, lightweight mechanical solution to the problem of inhibiting a broken spring portion entering a critical space that may damage or inhibit correct working of the landing gear assembly.

The spring support may be arranged to be externally coupled to the spring assembly.

Thus, the spring support may mounted externally with respect to the spring, facilitating easy maintenance and retrofitting to existing landing gear.

The spring support may be formed of a lightweight material, such as a metal alloy, a composite material or a hard plastics material. Preferably the spring support is made of titanium.

Thus, the spring support may provide a lightweight solution in comparison with known solutions.

The spring support may be attached to the first anchor element.

The spring support may be arranged to contact the second part so as to bridge the critical space in the event of a spring failure.

Each spring assembly may comprise a second anchor element attached to the spring and coupled to a part of the landing gear assembly other than the first part of the landing gear assembly.

The second anchor element may be coupled to the second part of the landing gear assembly.

The first anchor element may comprise an elongate arm, a first end of which is movably coupled to the first part of the landing gear assembly and a second end of which defines an engagement potion arranged to engage with the spring, wherein the spring support is attached to the elongate arm between the first end and the engagement portion.

The first part of the landing gear assembly may comprises an arm of a stay.

The second part of the landing gear assembly may comprise an arm of a lock link.

The landing gear assembly may comprise two spring assemblies arranged in a side by side configuration, and two spring supports.

In accordance with a second aspect of the present invention, there is provided an aircraft including one or more landing assemblies assembly according to the first aspect.

BRIEF DESCRIPTION OF THE DRAWINGS

By way of example only, certain embodiments of the invention will now be described by reference to the accompanying drawings, in which.

DETAILED DESCRIPTION

Figure 1:
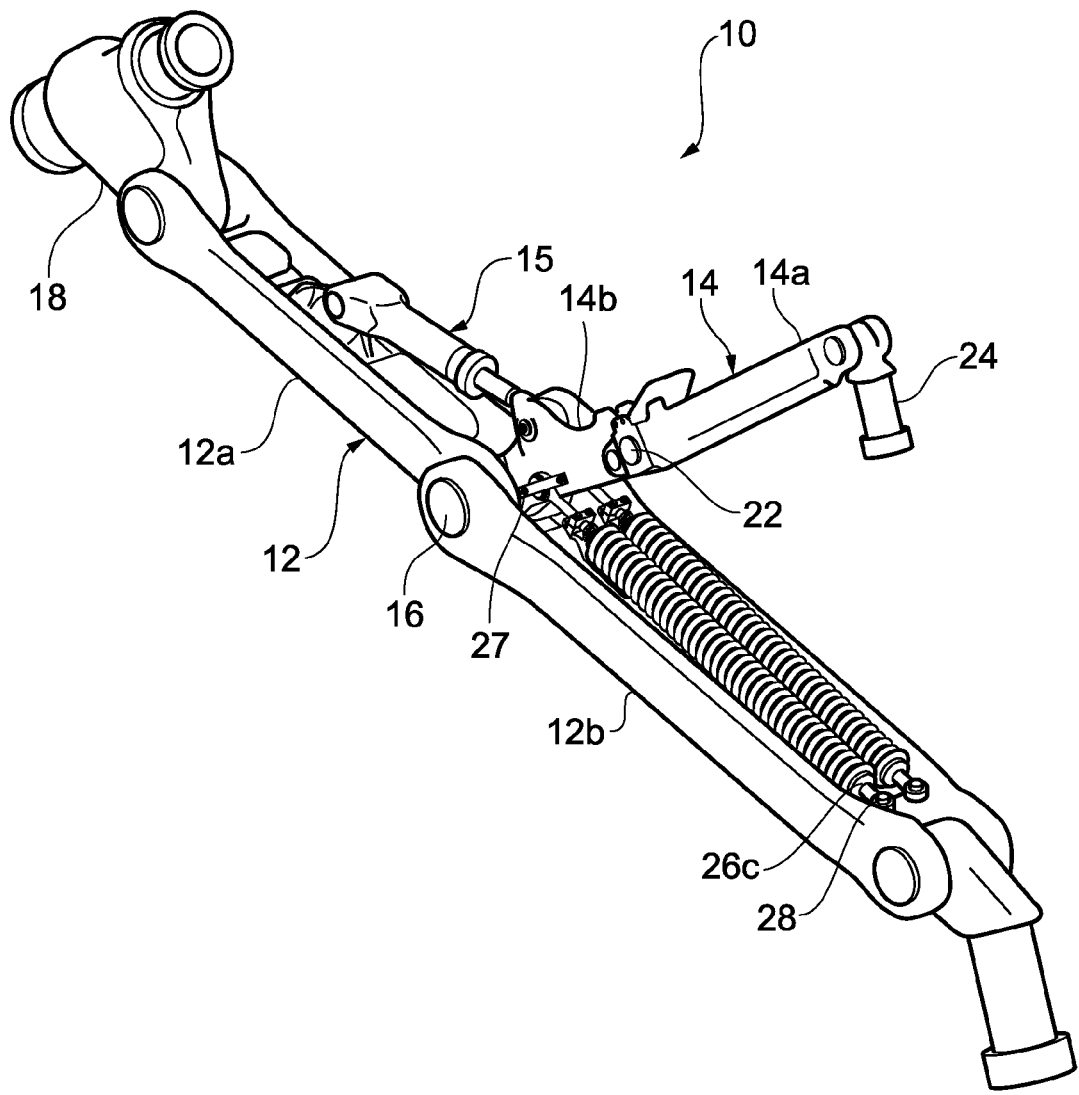
FIG. 1 is a diagram of a landing gear assembly according to an embodiment of the present invention.

As an overview, the present application relates to a landing gear assembly 10 having first and second parts 12b, 14b movably mounted with respect to one another. The landing gear assembly includes a critical space 32. A spring assembly 26 is arranged to bias the first and second parts to move relative to one another. A spring support 30 is provided to inhibit a broken portion of the spring assembly entering and/or contacting a part within the critical space following a spring failure.

FIG. 1 shows a landing gear assembly 10 according to an embodiment of the present invention. A landing gear assembly 10 according to embodiments of the present invention includes of a conventional foldable stay 12, a conventional lock link 14 and a pair of convention down locking spring assemblies 26, 26'. The landing gear assembly 10 also includes one or more spring supports 30 each configured to bridge a critical space in the event of a spring failure so as to inhibit a broken portion of the spring assembly 26, 26' entering the critical space.

The stay 12 is arranged to be moved between a folded condition, in which the landing gear assembly is stowed, and generally straight condition, in which the landing gear assembly is deployed. The stay 12 has an elongate upper stay arm 12a having a lower end defining a pair of lugs pivotally coupled via a pivot pin 16 to a pair of lugs defined at an upper end of an elongate lower stay arm 12b. The stay arms 12a, 12b may therefore pivotally move relative to one another about the pivot pin 16. The upper end of the upper stay arm 12a defines a pair of lugs that are pivotally coupled to a lug of a connector 18 which in turn in pivotally coupled to the airframe (not shown). The lower end of the lower stay arm 12b defines a pair of lugs that are pivotally coupled to a lug of a connector 20 which in turn is pivotally coupled to the main strut (not shown).

The lock link 14 has an elongate upper link arm 14a having a lower end pivotally coupled to an upper end of an elongate lower link arm 14b via a pivot pin 22. The link arms 14a, 14b may therefore pivotally move relative to one another about the pivot pin 22. An upper end of the upper link arm 14a defines a pair of lugs that are pivotally coupled to a lug of a connector 24 which in turn is pivotally coupled to the main strut (not shown). A lower end of the lower link arm 14b defines a lug that is pivotally coupled to lugs of the stay arms 12a, 12b via the pivot pin 16. Lugs of upper stay arm 12a are disposed between the lugs of the lower stay arm 12b and the lugs of the lower link arm 14b. A lock stay actuator 15 is coupled between the upper stay arm 12a and lower link arm 14b and arranged to pivotally move the link arms 14a, 14b so as to 'lock' and 'unlock' the lock link 14.

As will be appreciated, when the lock link is in the locked condition, as illustrated in FIG. 1, the upper and lower arms 14a, 14b are generally longitudinally aligned or coaxial, or may in some cases be 'over-centre', such that the lock link 14 is arranged to oppose a force attempting to fold the stay 12 so as to move the landing gear from the deployed towards the stowed condition. When in the unlocked condition, the link arms 14a, 14b are not aligned, meaning that folding of the stay 12 results in folding the lock link 14. When in the unlocked condition, a retraction actuator (not shown) coupled between to the main strut and the airframe can move the landing gear assembly between the deployed and stowed conditions.

Figure 2:
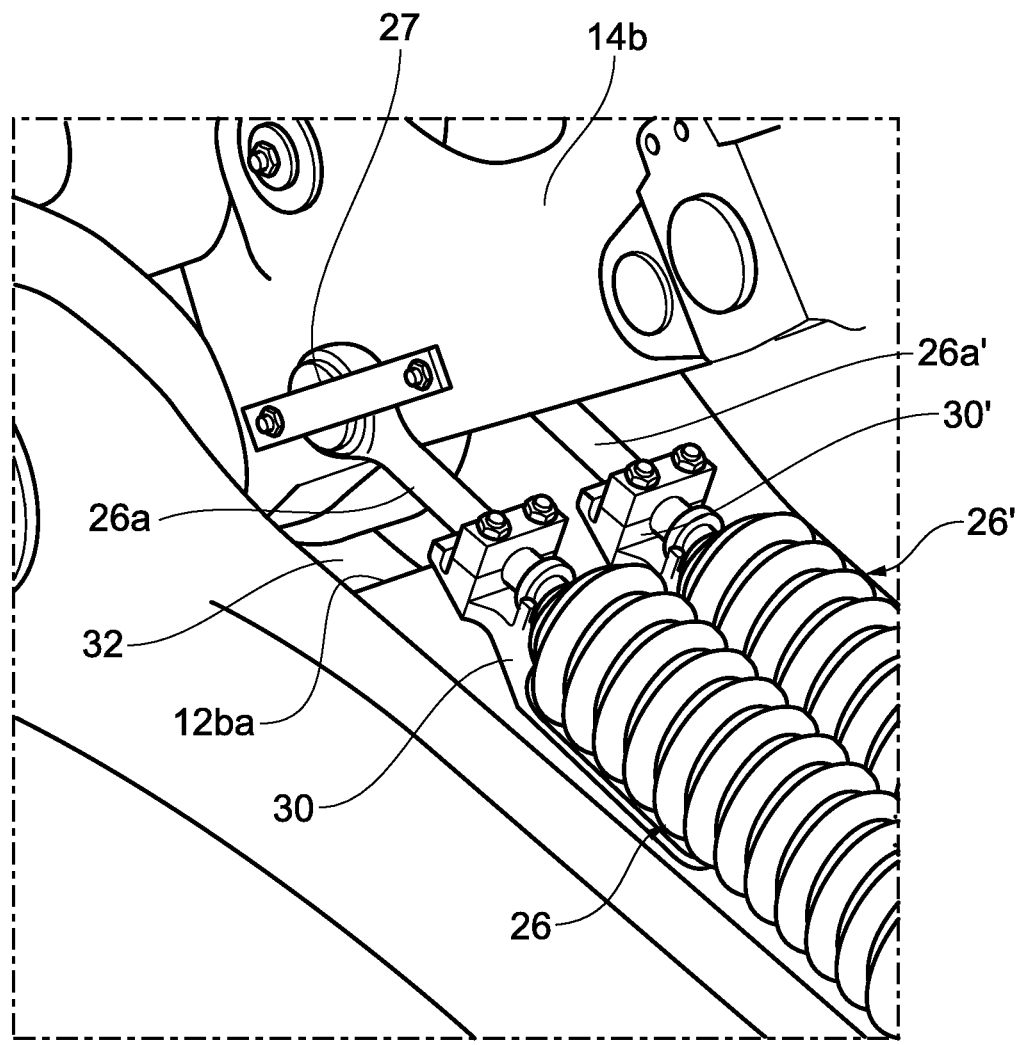
FIG. 2 is an enlarged view of part of the landing gear assembly of FIG. 1.

The spring assemblies 26, 26' have very similar configurations and as such, for brevity, only one will be described. The spring assembly 26 has an upper end pivotally coupled to the lower link arm 14b via a connector 27 at a location close to the pivot pin 16, and a lower end coupled to the lower stay arm 12b via connector 28 at a location close to the connector 20. The spring assembly 26 is arranged to bias the lock link 14 towards the locked condition by way of spring tension. Referring additionally to FIG. 2, the spring assembly 26 includes an elongate upper spring anchor element 26a, an upper end of which is pivotally coupled to the lower lock arm 14b via the connector 27, and a lower end of which defines a helical engagement formation that is attached to a proximal end of a spring 26b. A distal end of the spring 26b is coupled to the lower stay arm 12b via a lower engagement formation 26c.

As best illustrated in FIG. 2, an opening 32 exists between the upper lugs of the lower stay arm 12b. The opening 32 is arranged to accommodate the lower lugs of the upper stay arm 12a when the stay 12 is in a folded condition. The opening 32 defines a critical space because it is undesirable for an object to enter this space. As the stay 12 changes between the folded condition and straight condition, the critical space 32 enlarges in size. In parallel with the stay 12 unfolding, the lock link 14 changes between a folded condition, in which it is unlocked, and a generally straight condition, in which it locks the stay 12. This movement results in the lower link arm 14b moving angularly towards the critical space 32. Should the spring 26b break towards its top end i.e. the end closest to connector 27, the anchor element 26a and broken spring portion may pivot about the connector 27 and move into the critical space 32, which may result in damage to components of the landing gear such as the lower stay arm 12b, and in some cases may prevent the landing gear deploying fully. For example, the anchor element 26a and broken spring portion could contact the end of the lip 12ba of the lower stay arm 12b so as to axially react a force attempting to unfold the lock link 14.

To address this type of problem, the landing gear assembly 10 includes an elongate spring support arm 30 having a proximal end that is coupled to the anchor element 26a. The spring support arm 30 extends along the outside of a portion of the spring 26b by a sufficient amount to ensure that in the event of the spring 26b breaking, the free, distal end of the spring support arm 30 bridges the critical space 32 by contacting the lower stay arm 12b, thereby inhibiting movement of the anchor element 26a and broken spring portion into the critical space 32. The free end of the spring support arm 30 therefore defines a contact surface arranged to mechanically engage another part of the landing gear assembly 10 prior to the anchor element 26a, and in some cases a short length of spring 26b, entering the critical space defined by the opening 32.

The spring support arm 30 is arranged to be externally coupled to the spring assembly 26, 26'; in the illustrated embodiment the spring support arm 30 is a two piece assembly arranged to be assembled around the anchor element 26a, but many alternative possibilities for attachment will be apparent to the skilled person.

The spring support arm 30 provides a simple solution to the technical problem of how to reduce the likelihood of component damage, or jamming of the landing gear, due to spring failure. In some embodiments the spring support arm 30 is not contained within the spring 26b, but rather may be externally fitted to the spring assembly 26, which may simplify fitting and maintenance. Moreover, the spring support arm 30 may be formed of a lightweight material, such as titanium or carbon fibre, and does not affect the normal working of the spring assembly 26. Moreover, the spring support arm 30 does not couple the spring assemblies 26, to one another and therefore a spring failure in one spring assembly will generally not result in load transfer to the other spring assembly.

The spring support arm 30 may take any suitable form wherein it is coupled to the spring assembly and defines a contact surface that is spaced from the pivot point 27 by an amount sufficient to contact another part of the landing gear so as to bridge the critical space 32 in the event of a spring failure. It is preferred that the spring support arm 30 is coupled to the anchor element 26a because this enables the spring support arm 30 to inhibit the anchor element 26a entering the critical space following a spring failure anywhere along the spring 26b.

The spring support arm 30 may find utility in any landing gear assembly having a similar geometry to the illustrated embodiment i.e. an assembly including a critical space, which may be an opening or other critical space such as a region defining protrusions with which a broken spring part could engage, and a part to which a spring assembly is movable mounted such that upon the spring failing it has the capability of entering or engaging with the critical space in an manner that may result in damage to the landing gear assembly as the landing gear moves between the deployed and retracted conditions.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" can mean "including" or "consisting of" and therefore does not exclude the presence of elements or steps other than those listed in any claim or the specification as a whole. The singular reference of an element does not exclude the plural reference of such elements. In an apparatus claim enumerating several parts, several of these parts may be embodied by one and the same item of hardware. The mere fact that certain measures are recited in mutually different dependent claims does not indicate that a combination of these measures cannot be used to advantage.

The invention claimed is:

1. A landing gear assembly comprising:
    a first part;
    a second part movably coupled to the first part so as to be reversibly movable between first and second conditions;
    a space between the first part and the second part;
    a spring assembly arranged to bias the first part to move relative to the second part, the spring assembly comprising:
        a spring; and
        a first anchor element coupled to the spring and movably coupled to the first part of the landing gear assembly at a first anchor point; and
    a spring support coupled to the spring assembly, the spring support having a free end sized to bridge the space between the first part and the second part in the event of a spring failure;
    wherein the spring support is anchored to the first anchor element at a location spaced from the free end in a cantilevered manner.

2. A landing gear assembly according to claim 1, wherein the spring support is arranged to be externally coupled to the spring assembly.

3. A landing gear assembly according to claim 1, wherein the spring support is formed of a lightweight material.

4. A landing gear assembly according to claim 1, wherein the spring support is attached to the first anchor element.

5. A landing gear assembly according to claim 1, wherein the spring support is arranged to contact the second part so as to bridge the space between the first part and the second part in the event of a spring failure.

6. A landing gear assembly according to claim 1, wherein each spring assembly comprises;
    a second anchor element attached to the spring and coupled to a part of the landing gear assembly other than the first part of the landing gear assembly.

7. A landing gear assembly according to claim 6, wherein the second anchor element is coupled to the second part of the landing gear assembly.

8. A landing gear assembly according to claim 1, wherein the first anchor element comprises an elongate arm, a first end of which is movably coupled to the first part of the landing gear assembly and a second end of which defines an engagement potion arranged to engage with the spring, wherein the spring support is attached to the elongate arm between the first end and the engagement portion.

9. A landing gear assembly according to claim 1, wherein the first part of the landing gear assembly comprises an arm of a stay.

10. A landing gear assembly according to claim 1, wherein the second part of the landing gear assembly comprises an arm of a lock link.

11. A landing gear assembly comprising:
    a first part;
    a second part movably coupled to the first part so as to be reversibly movable between first and second conditions;
    a space between the first part and the second part;
    a spring assembly arranged to bias the first part to move relative to the second part, the spring assembly comprising:
        a spring; and
        a first anchor element coupled to the spring and movably coupled to the first part of the landing gear assembly at a first anchor point; and
    a spring support coupled to the spring assembly, the spring support having a free end sized to bridge the space between the first part and the second part in the event of a spring failure;
    wherein the landing gear assembly comprises two spring assemblies arranged in a side by side configuration and two spring supports.

12. A landing gear assembly according to claim 1, wherein the spring support is arranged to be removably coupled to the spring assembly.

13. An aircraft including one or more landing gear assemblies according to claim 1.

14. The landing gear assembly of claim 1, wherein the space between the first part and the second part comprises an opening between the first part and the second part which varies in size as the second part moves relative to the first part between the first and second conditions.

15. A landing gear assembly according to claim 14, wherein the first part of the landing gear assembly comprises an arm of a stay.

16. A landing gear assembly according to claim 14, wherein the second part of the landing gear assembly comprises an arm of a lock link.

17. A landing gear assembly according to claim 14, wherein the spring support is mounted externally with respect to the spring assembly.

18. A landing gear assembly according to claim 11, wherein the spring support is arranged to be externally coupled to the spring assembly.

19. A landing gear assembly comprising:
a first part;
a second part movably coupled to the first part so as to be reversibly movable between first and second conditions;
a space between the first part and the second part;
a spring assembly arranged to bias the first part to move relative to the second part, the spring assembly comprising:
a spring; and
a first anchor element coupled to the spring and movably coupled to the first part of the landing gear assembly at a first anchor point; and
a spring support coupled to the spring assembly, the spring support having a free end sized to bridge the space between the first part and the second part in the event of a spring failure;
wherein the spring support extends along a side of the spring.

20. A landing gear assembly according to claim 19, wherein the spring support is arranged to be externally coupled to the spring assembly.

* * * * *